Jan. 28, 1930.　　　R. N. COLLEY　　　1,745,246
HEATED WINDSHIELD WIPER
Original Filed March 1, 1928　　2 Sheets-Sheet 1
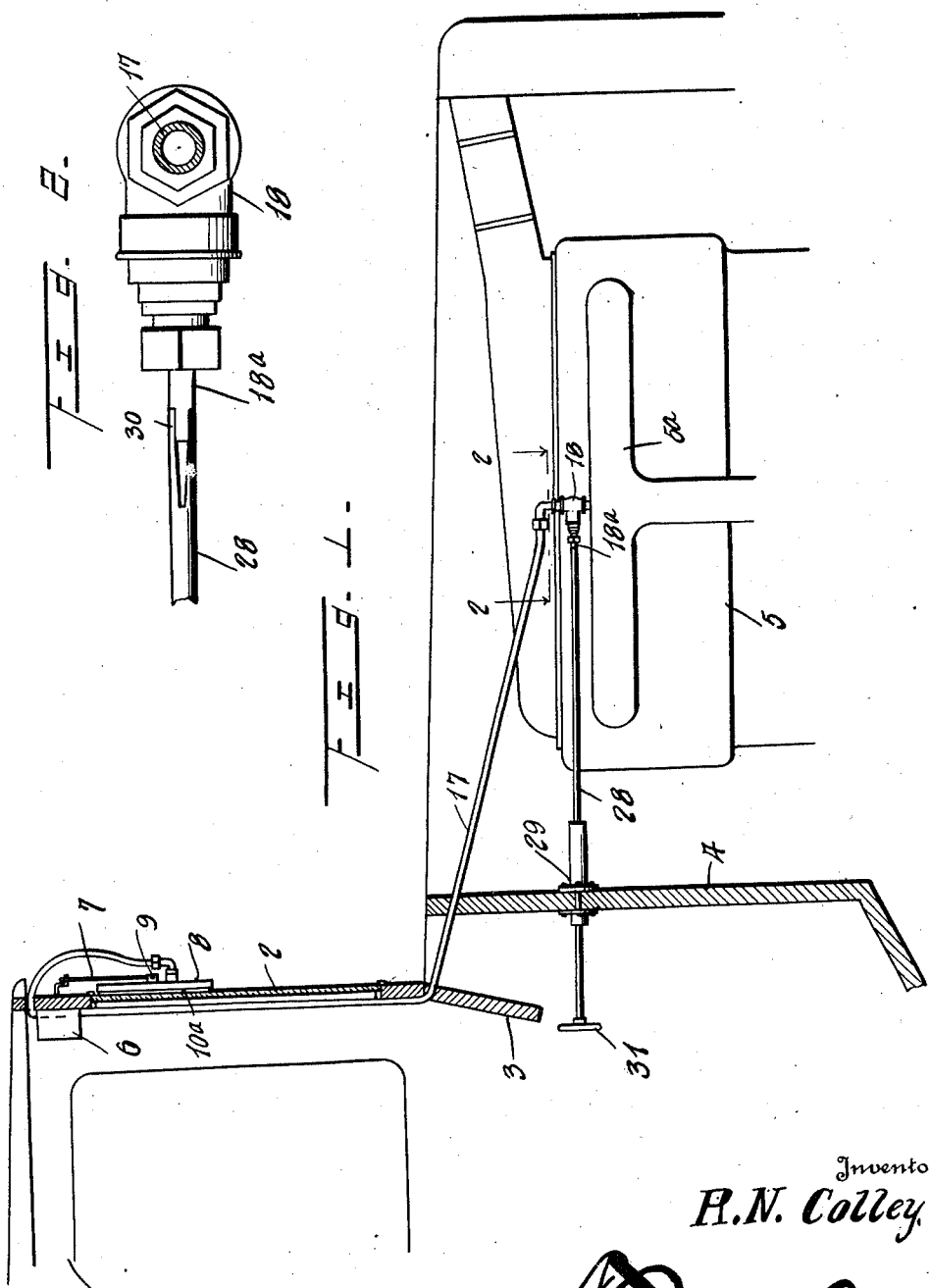
Inventor
R.N. Colley Jan. 28, 1930.  R. N. COLLEY  1,745,246
HEATED WINDSHIELD WIPER
Original Filed March 1, 1928  2 Sheets-Sheet 2
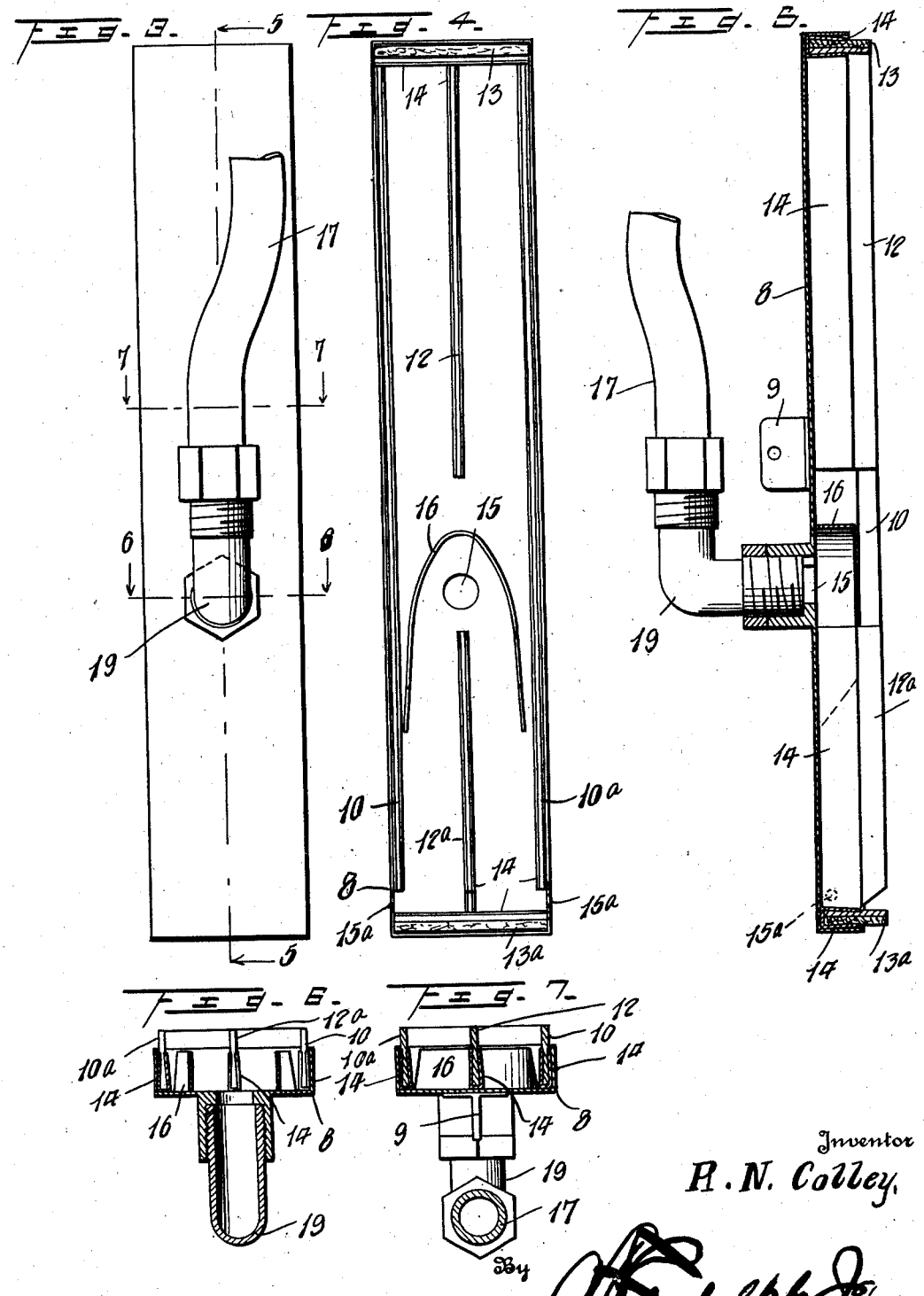

Patented Jan. 28, 1930

1,745,246

UNITED STATES PATENT OFFICE

REUBEN N. COLLEY, OF PROVIDENCE, RHODE ISLAND

HEATED WINDSHIELD WIPER

Application filed March 1, 1928, Serial No. 258,277. Renewed June 27, 1929.

This invention relates to wipers for the windshields of automobiles, and has for one of its objects to provide a novel, simple and inexpensive device of this character which will embody wiping strips contacting with the windshield and means adapted to direct a heating medium onto the windshield between the wiping strips, to the end that any condensation, frost, ice or snow, that may have accumulated on the windshield while the automobile was not in use, may be quickly removed and to the end that such materials will be prevented from accumulating on the windshield while the automobile is in use.

With the foregoing and other objects in view, the nature of which will appear as the description proceeds, the invention consists in the construction, combination and arrangement of parts hereinafter fully described and claimed, and illustrated in the accompanying drawings, wherein:

Figure 1 is a sectional view taken on a vertical plane extending longitudinally through the forward portion of an automobile equipped with a windshield wiper constructed in accordance with my invention, Figure 2 is a sectional view taken on the horizontal plane indicated by the line 2—2 of Figure 1, Figure 3 is a view in front elevation of the head of the wiper, Figure 4 is a view in rear elevation of the head of the wiper, Figure 5 is a sectional view taken on the vertical plane indicated by the line 5—5 of Figure 3, Figure 6 is a sectional view taken on the horizontal plane indicated by the line 6—6 of Figure 3, and Figure 7 is a similar view taken on the horizontal plane indicated by the line 7—7 of Figure 3.

Referring in detail to the drawings, 1 designates the body, 2 the windshield, 3 the instrument board, 4 the dash and 5 the engine of an automobile.

The windshield wiper comprises a motor 6 of any well known or appropriate construction, an arm 7 connected to the motor and oscillated thereby in advance of the windshield 2, a casing 8 pivoted, as at 9, to the arm and movable therewith over the windshield, and flexible wiping strips 10—12$^a$ carried by the casing and contacting with the windshield.

The casing 8 is of elongated rectangular contour, and is open at its rear side only. The wiping strips 10—12$^a$ are arranged longitudinally within the casing 8, and are secured therein by clamps 14 which may be secured to the casing in any suitable manner. The wiping strips 10 and 10$^a$ are arranged at opposite sides of the casing 8, and the wiping strips 12 and 12$^a$ are arranged one above the other at the longitudinal center of the casing. The proximate ends of the wiping strips 12 and 12$^a$ are relatively spaced, and at a point between these strips the casing 8 is provided with an intake port 15. A partition 16 of inverted U-form, is secured within the casing about the intake port 15 and the upper end portion of the partition 12$^a$, and is adapted to distribute about the casing the heated medium entering the casing by way of the intake port. The wiping strips 10—12$^a$ project beyond the rear side of the casing 8 into contact with the windshield 2. The casing 8 is provided in its sides and near its lower end with exhaust ports 15$^a$. To cause the heated medium to pass out of the casing by way of the exhaust ports 15$^a$, the casing 8 is provided at its upper and lower ends with packing strips 13 and 13$^a$ which extend therefrom into contact with the windshield 2.

The heated medium consists of the exhaust gases from the engine 5, and they are conveyed from the exhaust manifold 5$^a$ of the engine to the casing 8 by a tube 17 which is connected to the manifold by a valve 18 and to the casing by a coupling 19. The valve 18 is under the control of the driver through the medium of a rod 28 which is rotatably mounted in a bearing 29 carried by the dash 4 and which is connected to the stem 18$^a$ of the valve, as shown at 30. The rod 28 extends into the body of the automobile, and is provided at its rear end with a hand wheel 31.

It will be understood from the foregoing description and accompanying drawings, that when the engine 5 and motor 6 are in operation and the valve 18 opened the casing 8 with the wiping strips 10—12ᵃ will be oscillated over the windshield 2 and exhaust gases from the engine will be delivered onto the windshield between the wiping strips, with the result that that portion of the windshield directly in line with the vision of the driver will be kept free of moisture, condensation, frost, ice and snow. The amount of exhaust gases delivered to the casing 8 may be regulated and controlled by the valve 18.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

1. A windshield wiper comprising an elongated casing having relatively spaced wiping strips, means for supporting and operating the casing with the wiping strips in contact with the windshield, means adapted to deliver a heated medium to the casing intermediate of the ends thereof, and the casing provided with baffles therein to distribute the heated medium throughout the casing and to the windshield between the wiping strips.

2. A windshield wiper comprising a casing open at its rear side and provided in its front side with an intake port and in its lateral sides with a discharge port, wiping strips extending longitudinally of the casing, gaskets extending transversely of the casing between the wiping strips, means connected to the intake port for conducting a heated medium to the casing, and a partition within the casing for directing the heated medium throughout the casing.

In testimony whereof I affix my signature.

REUBEN N. COLLEY.